No. 657,861. Patented Sept. 11, 1900.
H. DARWIN, E. H. GRIFFITHS & W. C. D. WHETHAM.
ELECTRIC MEASURING AND INDICATING APPARATUS.
(Application filed May 29, 1900.)
(No Model.) 2 Sheets—Sheet 1.

Witnesses:
Katharine E. Manning
S. E. Lamb.

Inventors:
Horace Darwin
Ernest Howard Griffiths
William C. D. Whetham
By Knight Bros
Attorneys.

THE NORRIS PETERS CO., PHOTO-LITHO., WASHINGTON, D. C.

UNITED STATES PATENT OFFICE.

HORACE DARWIN, ERNEST HOWARD GRIFFITHS, AND WILLIAM CECIL DAMPIER WHETHAM, OF CAMBRIDGE, ENGLAND.

ELECTRIC MEASURING AND INDICATING APPARATUS.

SPECIFICATION forming part of Letters Patent No. 657,861, dated September 11, 1900.

Application filed May 29, 1900. Serial No. 18,472. (No model.)

*To all whom it may concern:*

Be it known that we, HORACE DARWIN, ERNEST HOWARD GRIFFITHS, and WILLIAM CECIL DAMPIER WHETHAM, subjects of the Queen of England, residing at Cambridge, England, have invented certain new and useful Improvements in or Relating to Electric Measuring and Indicating Apparatus, (for which application for patent has been made in Great Britain under No. 16,926, dated August 21, 1899,) of which the following is a specification.

This invention relates to electric measuring and indicating apparatus, and has for its object the provision of means whereby electrical measurements, such as those of resistance or voltage, are automatically indicated and, if desired, recorded.

Apparatus according to this invention is adapted for use in the various methods of electrical measurement, commonly known as "null" methods—for example, the measurement of potential differences by the potentiometer method or of resistance by the Wheatstone bridge and its numerous modifications.

The essential feature of this invention is the employment of a circuit capable of motion when a current passes through it—for example, the coil of a D'Arsonval galvanometer or of an electrodynamometer—such circuit being so arranged that it automatically sets itself into a position where "balance" is obtained—that is, where no current flows through it—thus indicating the amount of some electrical quantity. Conveniently the current may leave the movable circuit or coil by a long arm or "boom" suspended from its lower end, this boom being placed in connection with a bridge-wire corresponding in its functions to the wire of a meter-bridge. The connections are so arranged that if the boom is in contact with the bridge-wire at any point except that where balance exists the current flowing through the coil will tend to cause it to turn and move the boom along the wire until the balancing-point is reached.

Figure 1:
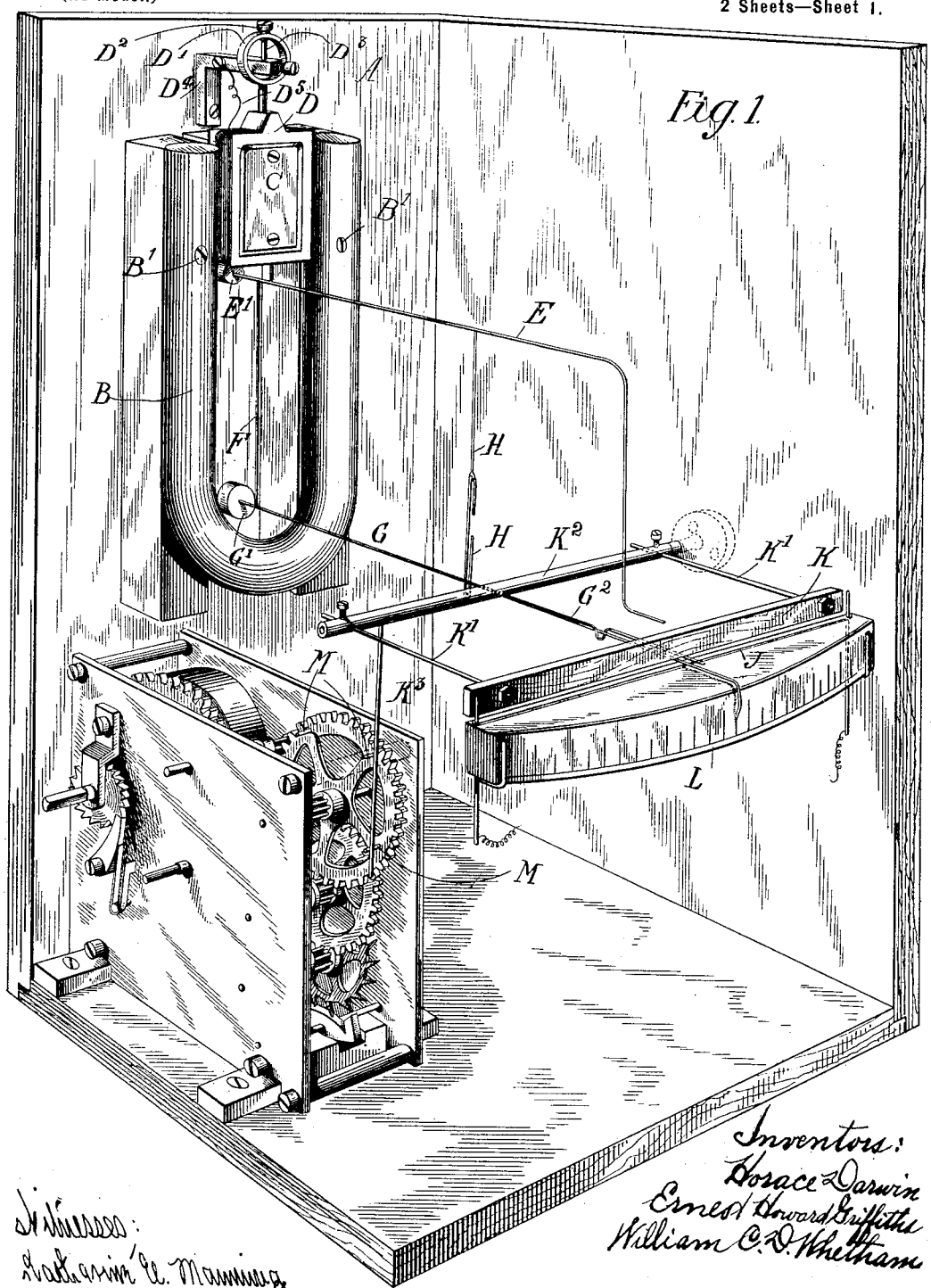
Figure 2:
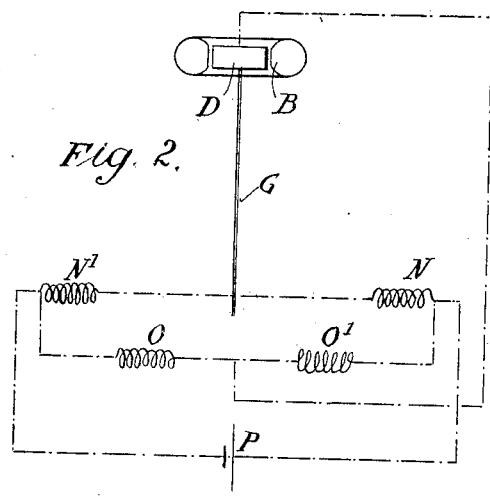
Figure 3:
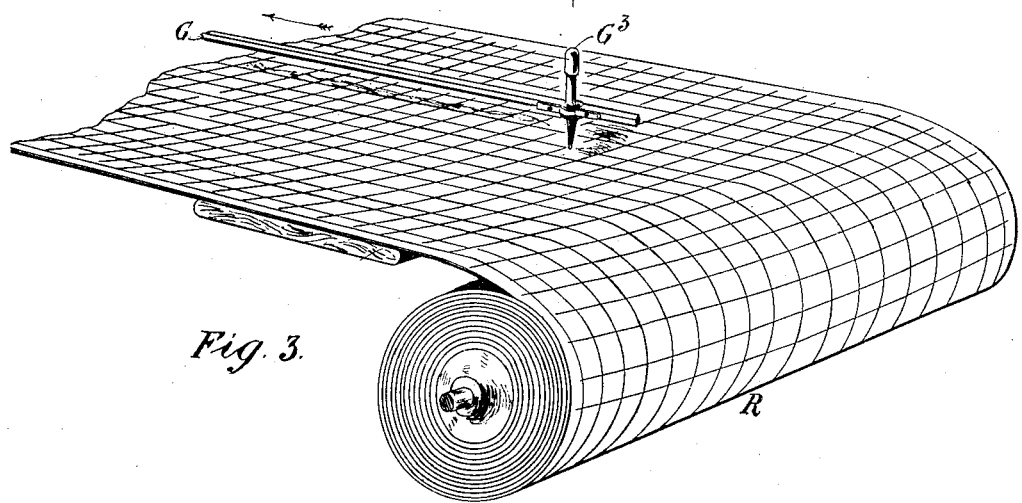
Figure 4:
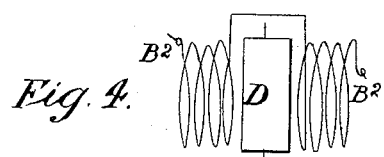

In the accompanying drawings, which illustrate one construction of apparatus according to this invention adapted, by way of example, to measure electrical resistances—as, for instance, in the measurement of temperatures by electrical pyrometers—Figure 1 is a perspective view of the apparatus, part of the containing-case being removed. Fig. 2 is a diagram illustrating the electrical connections of the apparatus. Fig. 3 is a perspective view of a recording device which may be used in apparatus according to this invention; and Fig. 4 illustrates, diagrammatically, a portion of the apparatus adapted for use with alternating currents.

Like letters indicate like parts throughout the drawings.

Within a case A, which may conveniently be provided with a glass top and front, (not shown,) is a permanent magnet B, secured, as by screws B', to the back of the case. A block C of magnetic material is fixed between the poles of the magnet B, and in the magnetic field between the poles of the magnet B and the block C a coil D is suspended. Fixed to the upper part of the coil D is a ring D', into which a screw $D^2$ is inserted, this screw having an agate cup at its lower end. The cup is supported upon a pivot $D^3$, carried by a bracket $D^4$, attached to the case A. Current is led into the coil D through a fine wire $D^5$, which is connected to the bracket $D^4$. The magnet B, with its coil D, forms a galvanometer of the well-known D'Arsonval type.

Rigidly attached to the lower end of the coil D is a horizontal arm or boom E, and a torsion-conductor F in the form of a fine metal strip connects the bottom end of the coil and the boom E with another boom G, the booms E and G being joined by links H. Counterweights E' and G' are provided for the booms E and G, respectively. The lower boom G serves, as is hereinafter described, as a conducting-arm to make connection between the coil D and a bridge-wire J, supported within the case A. A light spring $G^2$ is attached to and extends above the boom G, and the end of that boom is arranged to move over a scale L, and thus indicate the position of the balancing-points upon the bridge-wire and the magnitude of the electrical quantity measured.

In order that the boom G shall alternately make contact with and be free to travel over the bridge-wire J, a bar K, of non-conducting material, is provided, supported by arms K' from a pivoted bar or rock-shaft K², which is rocked automatically by means of pins M, attached to one member of a clockwork-train, these pins coming into contact as the wheel rotates with a downwardly-extending lever K³, attached to the rock-shaft K².

The positions of the bar K and the booms E and G are such that when the bar is in its lowest position, as shown in Fig. 1, the spring G² is compressed and the boom G pressed firmly against the bridge-wire J, the end of the upper boom E being then slightly above the top of the bar K. When owing to the rocking of the shaft K² the bar K is raised, its upper edge comes into contact with the end of the boom E before it has ceased to press upon the spring G²—that is to say, there is no interval of time during which both booms E and G are free to move, and for a short interval both are in contact with the bar K.

By reference to Fig. 2 it will be seen that the bridge-wire J is equivalent in the scheme of electrical connections there represented to the bridge-wire of a meter-bridge, the booms E and G forming what may be termed an "automatically-moving" key in the galvanometer-circuit.

At one end of the bridge-wire J, Fig. 2, is a resistance N, and another resistance N' is connected to the other end of the bridge-wire Resistances O and O', preferably equal to one another, form the other arms of the bridge, a battery P being connected in the usual way across opposite points of the circuit.

If the apparatus is used in the electrical measurement of temperatures, the resistance N would preferably be in the form of a platinum pyrometer, while the resistance N' would be formed of, say, manganin or some other substance having a very small coefficient of increase of resistance with temperature, the two resistances N and N' being equal at some given temperature. At that temperature if the resistances O and O' are equal balance will of course be obtained when the boom G is in contact with the middle point of the bridge-wire J. The coil D is wound in such a direction that if a current flows through it, owing to there being a difference of potential between its two ends, it will turn in the direction which will move the boom G toward the balancing-point. Suppose now that a change of one of the resistances N occurs when the apparatus is in the position shown in Fig. 1, the coil will turn against the slight couple exerted by the torsion-conductor F and will carry the top boom E toward the balancing-point. The bar K on rising frictionally engages the end of the boom E and keeps the coil in its new position and then releases the lower boom G, which, through the action of the torsion-conductor F and the links H, moves along until it comes beneath the top boom E. On its next descent the bar K makes contact between the boom G and the bridge-wire, and the current again flows through the coil D if the balancing-point has not been reached. This action goes on until the coil D has set itself so that no current flows through it when contact is made between the boom G and the bridge-wire J.

When the two booms are joined, as shown in Fig. 1, by a link, it is not absolutely essential that the conductor F should be a torsion wire or strip, for the link will serve to cause the lower boom to follow the motion of the upper boom. Further, where a torsion-strip is used as the suspension for the lower boom it is not essential that a link should be employed. Conveniently, however, both a torsion-conductor and a link are used, as in the construction illustrated in Fig. 1.

If it is desired to preserve a record of the various positions of the boom G relatively to the bridge-wire J, a device similar to that shown in Fig 3 may be used, a tracing-point G³ being secured to the boom G, so that when the latter is depressed by the bar K the tracing-point is brought into contact with a traveling record-strip R.

Apparatus according to this invention may be used with alternating currents; but it is then necessary to replace the magnets of the D'Arsonval galvanometer by coils of wire through which the alternating currents flow and produce an alternating magnetic field. Such an arrangement is diagrammatically represented in Fig. 4, the coils B² being the field-coils. The bridge-coils are connected with the field-coils, and, if desired, a shunt-coil is provided, which may or may not possess self-induction. The circuits are so arranged that any difference of phase between the applied alternating electromotive force and the current in the field-coils shall be the same, or approximately the same, as the difference in phase between the electromotive force and the current in the bridge. The changes of current in the moving coil thus synchronize with those in the field-coils, and therefore measurements of resistance, &c., may be made as in the case of direct currents. These particular arrangements, however, form no part of the present invention, but are mentioned as showing that the apparatus according to this invention may be used with alternating currents.

Although in the construction herein described and illustrated only one of the booms serves as a conducting-arm, yet both booms may serve that purpose, if desired. In that case, however, the booms would preferably be placed one above and the other below the bridge-wire and two bars similar to the bar K would be used, one operating to press the lower boom up against the bridge-wire, while the other bar presses the upper boom down upon the wire, these actions taking place alternately, the one boom not being released until the other is in contact with the bridge-wire.

The scale L may be graduated so as to give directly measurements of resistance, temperature, or other quantity which is measured electrically by the apparatus, and instead of a pointer moving across a scale other means, such as a beam of light reflected from a mirror mounted upon the boom, may be used to indicate the position of the balancing-point It is to be understood that various modifications may be made in apparatus of the kind above described without departing from the spirit of this invention and that the particular application to the measurement of resistances is merely given by way of example, the invention being adapted, as hereinbefore mentioned, to the determination of any electrical quantity by a null method.

What we claim as our invention, and desire to secure by Letters Patent, is—

1. In electrical measuring and indicating apparatus the combination of an electric circuit as used in a null method, a movable conductor connected between two points of said circuit, means whereby the conductor automatically alters its point of connection with the circuit until the balancing-point is reached and means for making an intermittent contact between the circuit and the conductor and for arresting the motion of the conductor when such contact is broken substantially as set forth.

2. In electrical measuring and indicating apparatus the combination of an electric circuit as used in a null method, a movable conductor connected between two points of said circuit, means whereby the conductor automatically alters its point of connection with the circuit until the balancing-point is reached, means for making an intermittent contact between the circuit and the conductor and for arresting the motion of the conductor when such contact is broken and means for indicating the position of the point of connection between the circuit and the coil substantially as set forth.

3. In electrical measuring and indicating apparatus the combination of an electric circuit as used in a null method, a movable conductor connected between two points of said circuit, means whereby the conductor automatically alters its point of connection with the circuit until the balancing-point is reached, means for making an intermittent contact between the circuit and the conductor and for arresting the motion of the conductor when such contact is broken, means for indicating the position of the point of connection between the circuit and the coil and means for recording such position substantially as set forth.

4. In electrical measuring and indicating apparatus the combination of an electric circuit as used in a null method, a bridge-wire forming part of said circuit, a magnetic field, a coil suspended in said field and connected between two points of said circuit, a torsion-conductor attached to the coil and in electrical connection therewith, a conducting arm or boom at the lower end of the torsion-conductor, a second arm or boom rigidly attached to the coil, a non-conducting bar situated between the two arms, means for automatically moving the bar so that it presses alternately against each arm, a fixed scale and an indicator on the lower conducting-arm serving to show the position at which said arm makes contact with the bridge-wire substantially as set forth.

5. In electrical measuring and indicating apparatus the combination of an electric circuit as used in a null method, a bridge-wire forming part of said circuit, a magnetic field, a coil suspended in said field and connected between two points of said circuit, a torsion-conductor attached to the coil and in electrical connection therewith, a conducting arm or boom at the lower end of the torsion-conductor, a spring attached to the conducting-arm, a second arm or boom rigidly attached to the coil, a link connecting the two arms, a non-conducting bar situated between the two arms, means for automatically moving the bar so that it presses alternately against each arm, a fixed scale and an indicator on the lower conducting-arm serving to show the position at which said arm makes contact with the bridge-wire substantially as set forth.

6. In electrical measuring and indicating apparatus an electric circuit as used in a null method, a bridge-wire forming part of said circuit, a magnetic field, a coil suspended in said field and connected between two points of said circuit, a torsion-conductor attached to the coil and in electrical connection therewith, a conducting arm or boom at the lower end of the torsion-conductor, a second arm or boom rigidly attached to the coil, means for alternately bringing the lower conducting-arm into contact with the bridge-wire and for frictionally engaging the upper arm and means for indicating the position at which the conducting-arm makes contact with the bridge-wire substantially as set forth.

7. In electrical measuring and indicating apparatus an electric circuit as used in a null method, a bridge-wire forming part of said circuit, a magnetic field, a coil suspended in said field and connected between two points of said circuit, a torsion-conductor attached to the coil and in electrical connection therewith, a conducting arm or boom at the lower end of the torsion-conductor, a second arm or boom rigidly attached to the coil, means for alternately bringing the lower conducting-arm into contact with the bridge-wire and for frictionally engaging the upper arm, means for indicating the position at which the conducting-arm makes contact with the bridge-wire and means for recording such position substantially as set forth.

In testimony whereof we have signed our names to this specification in the presence of two subscribing witnesses.

HORACE DARWIN.
  ERNEST HOWARD GRIFFITHS.
  WILLIAM CECIL DAMPIER WHETHAM.

Witnesses:
 PERCY M. MARSHALL,
 CHARLES E. LAWRENCE.